UNITED STATES PATENT OFFICE.

HAROLD HIBBERT, OF PITTSBURGH, PENNSYLVANIA.

SOLVENT AND PROCESS OF PRODUCING THE SAME.

1,283,183.     Specification of Letters Patent.     Patented Oct. 29, 1918.

No Drawing. Application filed October 27, 1915, Serial No. 58,245. Renewed March 19, 1918. Serial No. 223,465.

*To all whom it may concern:*

Be it known that I, HAROLD HIBBERT, a citizen of Great Britain, residing at Pittsburgh, in the county of Allegheny and State of Pennsylvania, have invented certain new and useful Improvements in Solvents and Processes of Producing the Same, of which the following is a specification.

This invention relates to solvents and processes of producing the same; and it comprises a process of producing a solvent for nitrocellulose and other cellulose esters wherein carbohydrates are fermented to produce butyrates and other salts with organisms of the class of those known as butyric ferments, this fermentation being either direct or indirect as in first producing lactates and the like and thereafter converting these into salts of acids of the fatty acid series by a subsequent fermentation, the acids are liberated from the salts produced in such fermentation, and such acids are thereafter converted into mixtures containing ketones by treatment with a suitable catalyst at a high temperature; such ketone-containing mixture being either marketed directly or given a reduction treatment with hydrogen in the presence of a suitable catalyst to produce a greater or less amount of corresponding carbinols, such carbinols being acetylated or not as desired; and it also comprises as a new composition of matter a mixture comprising ketones corresponding more or less nearly to the mixture of acids produced by a butyric fermentation; and it also comprises such a mixture of ketones after a more or less complete conversion into carbinols or acetates of such carbinols; such ketonic mixture being a pleasantly smelling liquid having good solvent power for cellulose derivatives, such as the nitrates, having a boiling point ranging between 110 to 160° with the major portion boiling between 120 to 145° having a specific gravity, in a dry condition, ranging around 0.8, distilling readily with steam at a temperature somewhat below 100° C. and separating readily from water, being substantially insoluble in water, being only slightly hygroscopic in its properties, being miscible with hydrocarbon non-solvents for cellulose nitrate and the like, and giving with cellulose nitrate, with or without admixture of such non-solvents, solutions which dry down to clear, transparent and tenacious films; all as more fully hereinafter set forth and as claimed.

The application of nitrocellulose, and particularly the forms known as pyroxylin and the like, to the lacquer and varnish industries, as is well known, largely depends on the nature of the solution obtained by dissolving it with a given solvent. These solutions differ very much in their properties. Some solvents give solutions which dry down to an opalescent film while others give clear films. Each solvent has its own specific nature as regards the properties of the film which can be produced from it. Some solvents tolerate the admixture of large quantities of bodies which are technically termed "non-solvents" such as gasolene, benzene (benzol), etc., without affecting their own solvent properties and with improvement in the character of the film produced. Other solvents will not tolerate such additions. These additions are commercially desirable both for the purpose of thinning the solution and for the reason that as a rule better films are obtained by their use. In spite of its high price and the limited supply, amyl acetate is the preferred solvent in this industry for the reason that it gives highly desirable films, is not materially hygroscopic, tolerates large addition of non-solvents, etc.

The purpose of the present invention is to produce a solvent or class of solvents, from a cheap source which will have the desirable properties of amyl acetate in an even increased degree and which are particularly applicable to the manufacture of nitrocellulose or pyroxylin plastics, varnishes, lacquers, etc. To this end, I first produce a fermentation mixture containing butyrates and salts of other fatty acids. None of the well known butyric ferments, all or any of which may be used for my purpose, produces a pure product; they all ferment carbohydrates in the presence of neutralizing agents with production of mixtures of the salts of the various acids of the fatty series. The butyrates however, as a rule, predominate. This production of salts of a plurality of different acids, for my purposes, is an advantage rather than disadvantage as will be hereinafter more fully pointed out. Having made a mixture of salts of these acids by fermentation, I next set free the fatty acids with sulfuric acid or any other suitable acid, such as hydrochloric acid, phosphoric acid, etc. For example, I may inoculate any suitable mixture containing carbohydrates with a lactic ferment and produce lactic acid, advantageously in the presence of sufficient chalk or other suitable form of calcium carbonates to form lactate of calcium (lactate of lime). Zinc carbonate and other neutralizing agents may be used but offer no advantage over chalk. For fermentation there may be advantageously used final molasses, whey, yeasts maker's slop, distillery slop, or any other cheap material containing carbohydrates. Distillery slop from sour mash whisky is particularly suitable since it already contains a considerable amount of lactic acid. After the lactic fermentation is complete I may then inoculate with any suitable butyric ferment which will convert lactates and such other salts as may be present into butyrate of lime and other salts. Butyrate of lime generally predominates in the resulting product. Pure cultures are not necessary or desirable for the present purposes for reasons stated *ante*. Instead of first fermenting to form lactate and then converting this into butyrate as described the liquid may be inoculated with any ferment producing butyrates directly. But the yields are somewhat better in going through the lactate stage. Production of lactate and conversion into butyrate may of course be simultaneous, the liquid being inoculated with both lactic and butyric acid ferments.

After the fermentation is complete the crude lime salts may be recovered from the solution in any suitable way as by filtering and evaporating. Evaporation may be carried down to the point of producing crystallized salts or merely to produce a more concentrated solution. If the neutralizing agent employed is chalk, as it usually is, and sulfuric acid is used for setting the acids free, the acid may be simply added to the dilute solution and the solution filtered from the sulfate of calcium formed. If the solution is quite dilute, the fatty acids formed will remain in solution; but if it is concentrated, the fatty acids may separate as an oily layer. Separation of the fatty acids as an oily layer will usually occur where a concentrated solution is used and hydrochloric acid is employed for freeing the acids. Where sulfuric acid is employed as the decomposing agent in a dilute solution, the calcium sulfate as it is precipitated carries down the bacteria and other solid matters, so that on decantation or filtering a clear solution results.

Either a dilute watery solution of the acids produced as above described may be used in the present process or the oily mixture of acids. The water solution may be rectified to give the oily mixture of acids. This rectification however is not necessary though sometimes desirable.

Operating as described, the acid products made are always an admixture of a number of acids ranging from acetic to caproic or even higher, but with butyric acid predominating. It is desirable to have butyric acid predominating for the reason that in the later operations there is then given a ketone mixture having its predominant boiling point around 140° C.; a very good temperature for the present purposes.

The oily mixture of acids or the water solution of acids so produced is next vaporized in any suitable manner and the vapors passed over a ketone-forming catalyst. Thorium oxid contained in a bulk giving carrier such as pumice stone, kieselguhr, etc., may be employed. A suitable catalyst may be produced by dissolving 1 pound of thorium nitrate in 2 gallons of water and impregnating 50 pounds of pumicestone with the mixture, drying and heating. Instead of thorium oxid there may be used a number of other oxids, such as cerium oxid, zirconium oxid, or uranium oxid. These oxids may be used in the form of their nitrates for impregnating carriers of the character described.

The use of a water solution of the acids for furnishing the vapors in the catalytic treatment works well. This water solution may range in strength from 5 per cent. upward without detriment to the process. Or the dry oily acids may be used. But the presence of some steam in the reaction zone, and the aqueous acids give this, is desirable. In using thorium oxid as the catalyst, it may be maintained at a temperature between 350 and 550° C. by any suitable heating means in any suitable chamber and the vapors of the acids together with the accompanying water vapor passed over it. With suitable manipulation and care, the acids will be converted into the corresponding ketones. On cooling the vapors coming from the catalyzing chamber the ketones and the water can be readily condensed together. The ketones are immiscible with water and separate readily. On drying and redistilling the mixture of ketones so produced, it generally boils between 120 to 150° C. In one typical material made in the manner just described, the proportions boiling at the various temperatures were roughly as follows:

110—120° C. approximately 20 per cent.
120—145° C. approximately 75 per cent.
145—155° C. approximately 5 per cent.

As will be noted from these boiling points, the mixture had what may be described as a gradual boiling point with the predominant boiling point lying in the desirable temperature range of 120 to 145° C. In working with cellulose nitrate, it is desirable to have a solvent with a boiling point of this character, that is one which rises through a range of a number of degrees since a solvent of this character volatilizes from the film in drying in a better way and gives a better final film. The mixture of ketones possesses a very pleasant odor, and the material in this respect is much more desirable than amyl acetate, lacking the suffocating odor peculiar to the latter. The material dissolves nitrocellulose cleanly and quickly and the solutions thus formed are capable of withstanding high dilution with benzene or gasolene without precipitation. The solvent and the solution produced with it are much more desirable than amyl acetate or its solution being neutral in character instead of having the ester character of amyl acetate. Acid and alkalis do not affect it even in the presence of water. The nitrocellulose films which it forms as regards tenacity and transparency are rather better than those obtained by the use of amyl acetate. The present solvent liquid of course may be used in admixture with fusel oil or amyl acetate and such admixtures for some purposes possess advantages as in the case of mantle dips, etc., or coating cartridge cases.

For special purposes, the character of the solvent may be advantageously changed by converting a greater or less proportion of the ketones which it contains into the corresponding carbinols or alcohols. The degree of this change of course depends upon the particular application desired. Reduction of the ketones to the alcohols in the degree which may be desired may be readily effected by means of hydrogen in the presence of nickel, nickel oxid, palladium, etc.; such reduction being either effected by treating the vapors or the liquid. The liquid may for example be treated with colloidal palladium and with hydrogen. Or the vapors together with hydrogen may be passed over hot nickel or nickel oxid.

Complete reduction of the ketones to the corresponding alcohols gives a solvent mixture which is highly advantageous for many purposes but I ordinarily effect only a partial reduction, leaving the mixture of more or less ketonic character; that is containing more or less of the original ketones. After the reduction of a part or all of the ketones to the corresponding alcohols, the mixture may be acetylated by treatment with acetic acid, etc., in the well known manner. In one modification of my invention a portion of the ketones may be reduced to carbinols and then these carbinols partially or completely converted into the corresponding acetates, thereby obtaining a final mixture of acetates with more or less of the original ketones. It is found that some of the isomeric ketones are more readily reduced than others and some of the alcohols are more readily acetylated than others so that this partial reduction or partial acetylation offers no difficulties. For special purposes, instead of acetylating, the carbinols or alcohols may be converted into benzoates, formates, etc.

The possibility of producing modified solvents in the manner just described adds materially to the utility of my new solvent.

In a typical embodiment of the present process I may take 1,000 gallons of yeast slop from which the insoluble grain hulls and the like may or may not be separated, add an excess of air slaked lime or chalk, and allow to ferment at a temperature of 35 to 40° C. for seven days. No particular inoculation is necessary for this purpose since in the organisms present the lactic ferments generally predominate. But the mixture may be sterilized and treated with any desired culture. This results in the formation of calcium lactate with, generally, more or less calcium butyrate, etc. The mixture is then inoculated with a butyric ferment and fermentation allowed to go forward until the lactate is substantially all converted into butyrates and other lime salts of fatty acids. Or instead of using a lactic ferment in the first impregnation the mixture of slop and lime may directly be impregnated with any of the direct butyric ferments like *B. butyricus*. The butyric acid fermentation as a rule should be conducted under anærobic conditions. After butyric fermentation is substantially complete, the liquid is filtered and evaporated down to crystallization. The crystallized mass or the concentrated solution, may be treated with sulfuric acid in slight excess and distilled. Either methyl orange or Kongo red may be employed for ascertaining the presence of an excess of sulfuric acid. Neither indicator responds to any extent to butyric acid. After addition of sulfuric acid the liquid may be decanted from the calcium sulfate formed and used directly for ketone making if desired. But as it contains much organic matter, as a rule it is better to distil it. This may be done in any suitable still, a current of steam being used if desired. As stated, the acids may be rectified to produce water free material; but this is not necessary.

The acids are next converted into vapor in any suitable apparatus and the vapors passed over the described pumice stone impregnated with thorium oxid. The water solution of the acids may be employed to furnish these vapors. If the acids have been rectified, it is in general better to dilute them with water before producing the vapors. But the oily free acids may be vaporized and the vapors mixed with a current of steam in the apparatus. It is not necessary to produce the vapors first; the aqueous solution of the acids may be allowed to drop directly on the hot catalyst. The temperature of the catalyst where thoria is used should not be much below 350° C. and not much above 500° C. Heating may be in any convenient manner. The vapors after passing the catalyst may be condensed in the usual manner and the water and oily ketones separated by settling. The oily ketones may be dried by rectification or by preliminary treatment with calcium chlorid followed by rectification.

Where it is desired to convert a portion of the ketones, say a third or a half, or all of them as the case may be, into the corresponding alcohols, the ketone mixture may be passed in the form of vapor admixed with hydrogen over nickel oxid or freshly reduced nickel at a temperature between 180—250° C. The proportion of hydrogen and the conditions may be such as to convert all the ketones into alcohols or to convert only the more readily reducible. In the former event if a mixture containing ketones is desired, the condensate beyond the reduction chamber may be admixed with more of the original ketone mixture. The reduced material may be readily acetylated by treatment in the usual way with acetate of soda and sulfuric acid, acetic acid and zinc chlorid, etc.; acetylation being carried to any degree desired.

Instead of setting free the butyric and other fatty acids and then converting the free acids into ketones, the dry crystallized salts recovered from the fermentation mixture may be directly heated to a ketone forming temperature. But the described method offers great technical advantages.

Butyric acid and the butyrates give butyrone; and butyrone always forms a large part of the ketonic mixture.

What I claim is:—

1. The process of making solvents which comprises submitting a carbohydrate to butyric fermentation to produce salts of fatty acids, freeing the acids from the salts and converting the acids into the corresponding ketones.

2. The process of making solvents which comprises submitting a carbohydrate to lactic and butyric fermentation to produce a solution of salts of fatty acids including butyrates, freeing the acids from the salts and converting the acids into the corresponding ketones.

3. The process of making solvents which comprises submitting a carbohydrate to butyric fermentation to produce salts of fatty acids, freeing the acids from the salts and converting the acids into the corresponding ketones by passing the vapors of such acids over a ketone-forming catalyst.

4. The process of making solvents which comprises submitting a carbohydrate to lactic and butyric fermentation to produce a solution of salts of fatty acids including butyrates, freeing the acids from the salts and converting the acids into the corresponding ketones by passing the vapors of such acids over a ketone-forming catalyst.

5. The process of making solvents which comprises submitting a carbohydrate to lactic and butyric fermentation to produce salts of fatty acids, freeing the acids from the salts and converting the acids into the corresponding ketones by passing the vapors of such acids over a catalyst comprising thoria.

6. The process of making solvents which comprises submitting a carbohydrate to lactic and butyric fermentation to produce a solution of salts of fatty acids including butyrates, freeing the acids from the salts and converting the acids into the corresponding ketones by passing the vapors of such acids over a ketone-forming catalyst.

7. The process of producing a compound solvent which comprises fermenting carbohydrates to form a mixture of acids comprising large amounts of butyric acid, converting such acids into the corresponding ketones and submitting the resulting ketone mixture to a hydrogenation treatment.

8. The process of producing a compound solvent which comprises fermenting carbohydrates to form a mixture of acids comprising large amounts of butyric acid, converting such acids into the corresponding ketones and submitting the resulting ketone mixture to a hydrogenation treatment and then to an esterifying treatment.

9. The process of producing a compound solvent which comprises fermenting carbohydrates to form a mixture of acids comprising large amounts of butyric acid, converting such acids into the corresponding ketones and submitting the resulting ketone mixture to a hydrogenation treatment and then to an acetylating treatment.

10. As a new composition of matter, a solvent liquid comprising a mixture of ketones of various boiling points but with a large portion of butyrone, such mixture having a boiling point ranging between 110—160°C with a major portion boiling between 120—145°, said liquid having a specific gravity in a dry condition ranging around 0.8, distilling readily with steam at a temperature somewhat below 100° C., being immiscible with water and separating readily therefrom and being a solvent for cellulose nitrate and other cellulose esters.

11. As a new composition of matter, a solvent liquid comprising ketones corresponding to the mixture of acids produced in the butyric acid fermentation of carbohydrates.

In testimony whereof, I affix my signature.

HAROLD HIBBERT.